(No Model.) 2 Sheets—Sheet 1.
S. COHN.
CIGAR MOLDING MACHINE.
No. 337,665. Patented Mar. 9, 1886.
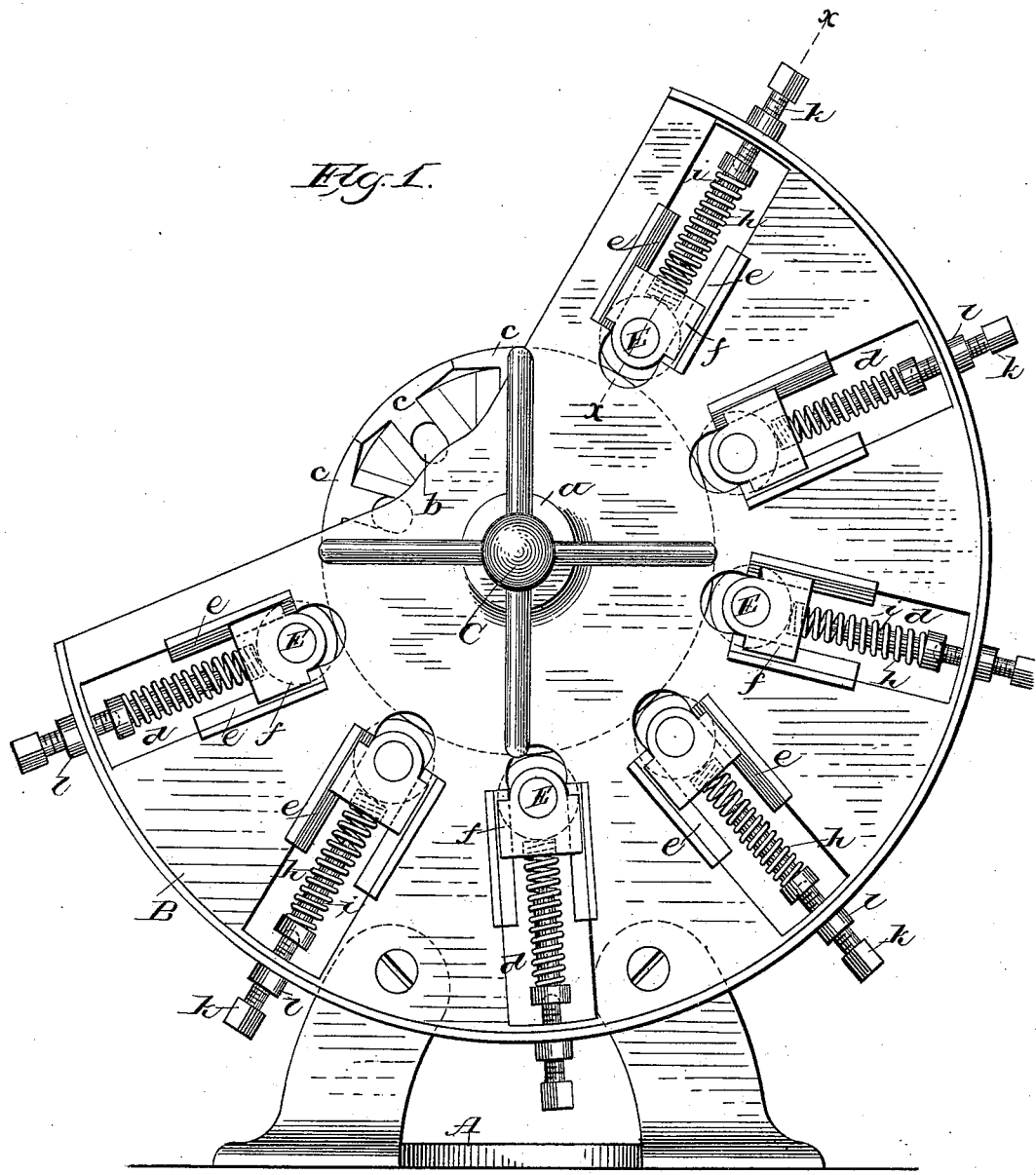
Witnesses:
Inventor:
Sigmund Cohn
By Stout & Underwood
Attorneys.

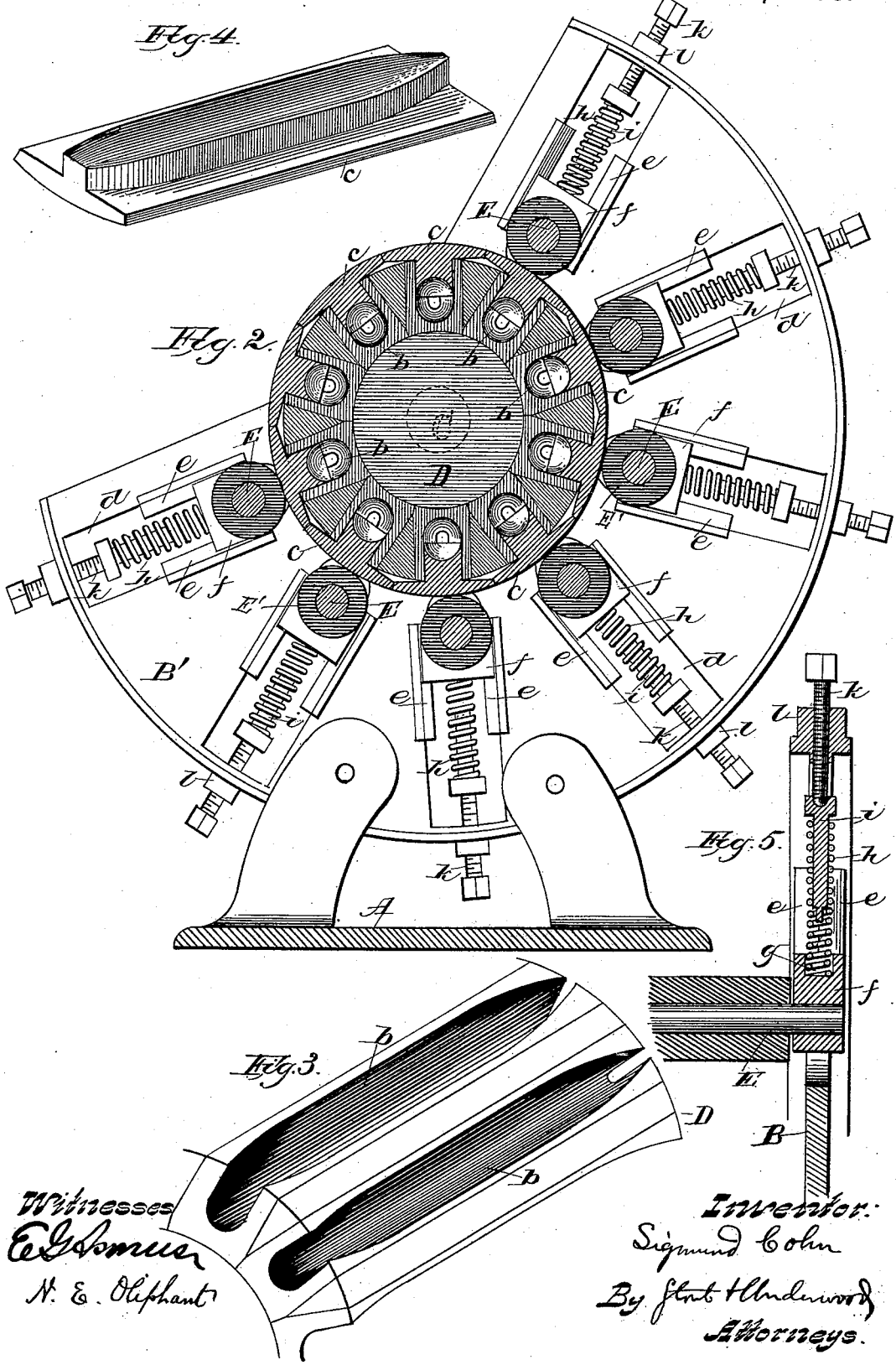

UNITED STATES PATENT OFFICE.

SIGMUND COHN, OF MILWAUKEE, WISCONSIN.

CIGAR-MOLDING MACHINE.

SPECIFICATION forming part of Letters Patent No. 337,665, dated March 9, 1886.

Application filed October 6, 1885. Serial No. 179,124. (No model.)

*To all whom it may concern:*

Be it known that I, SIGMUND COHN, of Milwaukee, in the county of Milwaukee, and in the State of Wisconsin, have invented certain new and useful Improvements in Cigar-Molding Machines; and I do hereby declare that the following is a full, clear, and exact description thereof.

My invention relates to machines for pressing cigar-fillers into shape in molds, and has for its object to produce a machine which will exert pressure upon each mold independent of the others; and the invention consists in the general construction and arrangement of the several operating parts, as will be hereinafter more fully described with reference to the accompanying drawings, making part of this specification, in which—

Figure 1 is a side elevation of my invention; Fig. 2, a vertical cross-section through the center of the same; Figs. 3 and 4, detail views; and Fig. 5, a section on line $xx$, Fig. 1.

The letter A represents a stand, to which are bolted two segments, B and B', each having a hub, $a$. These hubs $a$ form bearings for a shaft, C, having keyed thereto and revolving therewith a drum, D, the latter being formed with a series of depressions or molds, $b$, each of which is provided with a removable cap, $c$. The segments B B' are each formed with a series of radiating openings, $d$, each opening having its edges armed with guides $e$, to retain in operative position a loose box, $f$.

Journaled in the loose boxes $f$ are shafts E, which shafts may be covered with rubber or other elastic material, E', forming pressure-rolls. In the upper face of each box $f$ is a depression, $g$, for the reception of a spring, $h$, the latter supporting a spindle, $i$, which comes in contact with a set-screw, $k$, having a bearing in the rim of the segment, as shown at $l$. These boxes and their operative connections are located in the segments B B' and operate upon the ends of shafts or rolls E.

The fillers to be pressed are placed in the molds and covered by the mold-caps $c$, the drum being sufficiently rotated to carry the full molds beyond the point of filling and bring a set of empty ones into position. When the molds are first filled, the caps $c$ do not of course fit tightly down upon the molds; but as the drum is revolved the rollers E' gradually compress the filling by pressure upon the caps until, at the end of the operation, the caps are pressed down tightly upon the molds. After all or any desired number of molds in the drum are filled and the caps placed in position thereon, said drum is revolved and pressure is brought upon the fillers by the frictional contact of the elastic-covered shafts E with the mold-caps $c$, the extent of pressure being regulated by the tension of the springs $h$, which tension can be readily increased or diminished, as the operator may desire, by the adjustment of the set-screws.

It will be noticed that each filler is operated upon independently of the others in the drum, as the spaces between the pressure-rolls are equal to or a little more than the width of the molds $b$, thus preventing any filler from being acted upon by more than one of the pressure-rolls at the same time.

In my machine a firm pressure is given by the rollers E' to all the fillers in the drum, and a greater uniformity, as to shape, thickness, and other qualities of a good filler, secured.

I am aware that previous to my invention cigar-machines have been constructed with a revolving drum carrying the molds and the removable caps for the same, said caps being pressed upon the molds, as the drum revolves, by continuous presser-surfaces. I am also aware that such drums have been operated by rolls adjacent to the periphery of the drum, and an endless belt driven by said rolls and actuating the drum while also pressing upon the mold-caps; but my invention is quite distinct from such previous devices, as will be seen by reference to my claims.

Having now fully described my invention, what I claim as new, and desire to secure by Letters Patent, is—

1. In a machine for pressing cigar-fillers, the combination of a revolving drum formed with a series of molds, caps therefor, a series of yielding pressure-rolls, and a frame supporting said rolls in position to partly encompass the drum and come in frictional contact with the caps, as set forth.

2. A machine for pressing cigar-fillers, consisting of a revolving drum having a series of depressions or molds and removable mold-caps, two segments secured to a suitable stand and formed with hubs or bearings for the drum-shaft, a series of elastic-covered pressure-rolls journaled in loose boxes located in openings in the segments and pressing upon said caps, and the springs, spindles, and set-screws for regulating the pressure of the rolls, substantially as and for the purpose set forth.

3. The segments B B', formed with a series of openings, each opening having its edges armed with guides, the loose boxes working on said guides, the play being regulated by the spring, spindle, and set-screw mechanism $h$ $i$ $k$, in combination with the elastic-covered pressure-rolls journaled in said loose boxes, and the revoluble mold-drum having its shaft journaled in hubs formed upon each of the segments, substantially as and for the purpose set forth.

In testimony that I claim the foregoing I have hereunto set my hand, at Milwaukee, in the county of Milwaukee and State of Wisconsin, in the presence of two witnesses.

SIGMUND COHN.

Witnesses:
H. G. UNDERWOOD,
MAURICE F. FREAR.